United States Patent [19]

Dallavia, Jr. et al.

[11] Patent Number: 4,476,241

[45] Date of Patent: Oct. 9, 1984

[54] CATALYZING EMULSION PAPER RELEASE COMPOSITIONS

[75] Inventors: Anthony J. Dallavia, Jr., Clifton Park; Gordon T. Van Vleck; Frank J. Traver, both of Troy, all of N.Y.

[73] Assignee: General Electric Company, Waterford, N.Y.

[21] Appl. No.: 541,996

[22] Filed: Oct. 14, 1983

Related U.S. Application Data

[62] Division of Ser. No. 356,796, Mar. 10, 1982, Pat. No. 4,426,490.

[51] Int. Cl.³ .............................................. B01J 31/12
[52] U.S. Cl. .................................... 502/156; 502/152
[58] Field of Search ............................... 502/156, 152

[56] References Cited

U.S. PATENT DOCUMENTS 3,499,870  3/1970  Hadlock et al. ................. 260/46.5

Primary Examiner—Patrick Garvin
Attorney, Agent, or Firm—Hedman, Gibson, Costigan & Hoare

[57] ABSTRACT

A method of polymerizing silanol-containing organosilicon compounds is provided. Catalysts comprising dioctyl tin dineodeconate lend a unique combination of properties to curable silicone paper release coatings including long bath life, storage stability, low odor, reactivity over a wide temperature range and low release.

4 Claims, No Drawings

CATALYZING EMULSION PAPER RELEASE COMPOSITIONS

This is a divisional of application Ser. No. 356,796 filed Mar. 10, 1982 and now U.S. Pat. No. 4,426,490.

BACKGROUND OF THE INVENTION

This invention relates to a method for catalyzing emulsion paper release coating solutions. More particularly, it is found that dioctyl tin dineodeconate exhibits a unique combination of properties which renders it superior to conventional organo tin catalysts for paper release applications.

Diorgano tin salts have long been used to catalyze the polymerization of organosilicon compounds. They have been extensively employed, for example, in the vulcanization of silicone rubber and more recently to induce polymerization in siloxane resins used for non-stick cooking surfaces (frying pans, ovenware, etc.), as disclosed in U.S. Pat. No. 3,499,870 (Hadlock et al.), which is hereby incorporated by reference.

A wide variety of organo tin compounds such as dibutyl tin dilaurate, dibutyl tin dioctoate, dioctyl tin dilaurate and dioctyl tin S,S'-bis(iso-octyl mercapto acetate) have been used in the form of aqueous emulsions to initiate curing of emulsified silicon paper release coatings. These coatings typically contain blends of silanol-terminated polydimethylsiloxanes and methylhydrogen polysiloxanes in the discrete phase. The coating solutions are applied to paper from an emulsion bath and thereafter cured by heating (about 90° C. to about 225° C.) for a short period (<60 sec.).

For paper release coating applications, a number of properties for catalyst emulsions are desirable. Long shelf stability, long bath life, good reactivity across a broad temperature range, low odor and low release are highly valued by industrial users but heretofore have not been found in combination in a single organo tin compound.

It has now been discovered that the tin salt, dioctyl tin dineodeconate, is well suited for use as a catalyst in silicon paper release coatings and exhibits all of the aforementioned properties to a degree that makes it superior to conventional catalysts. It is also easily synthesized to a high level of purity, which may account for some of its unique properties.

Accordingly, it is an object of the present invention to provide a novel method for the polymerization of silanol-containing organosilicon compositions.

It is a further object of the present invention to provide a means of securing a unique combination of properties in silicone paper release compositions including shelf stability, long bath life, reactivity over a broad temperature range, low odor and low release.

These and other objects are accomplished herein by a method of polymerizing organosilicon compounds (1) containing at least one SiOH group and any remaining silicon valences in said organosilicon compound being satisfied by radicals selected from the group consisting of silicon-bonded oxygen atoms attached to other silicon atoms to form the siloxane linkage, silicon-bonded nitrogen radicals to form the silazane linkage, silicon-bonded sulfur radicals to form the Si—S—Si linkage, Si—Si linkage, and organic groups attached to the silicon through the SiC linkage selected from the group consisting of disilylalkylene, disilylarylene, disylhydrocarbon ether linkage, monovalent hydrocarbon, monovalent halohydrocarbon, monovalent hydrocarbon ether, nitrile-substituted monovalent hydrocarbon, ester substituted monovalent hydrocarbon, and monovalent hydrocarbon group substituted with an amino amido, and sulfide groups, there being on the average from 0.9 to 3 of said organic groups attached to the silicon which comprises contacting said organosilicon compound with (2) a catalyst comprising dioctyl tin dineodeconate, at a temperature sufficient to cause an increase in the molecular weight of said organosilicon compound.

DETAILED DESCRIPTION OF THE INVENTION

The method of the present invention involves contacting silanol-containing organosilicon compounds with a dioctyl tin dineodeconate catalyst at a temperature sufficient to promote polymerization, i.e., crosslinking of the organosilicon compounds resulting in an increase in their molecular weight.

The catalyst employed in the present invention, dioctyl tin dineodeconate, is useful as a polymerization catalyst and especially as a curing catalyst in which a polyfunctional organosilicon compound is rendered insoluble and infusible. The operativeness of the compositions herein applies to any organosilicon compound containing at least one silanol (Si—OH) group. In addition, the organosilicon compound may contain other silicon functional groups (Si—X) which react with water to form Si—OH groups, or which react directly with Si—OH groups to form Si—O—Si bonds with the elimination of HX. This allows for the use of the catalyst disclosed herein with silicon compounds containing only Si—X groups, which compounds are then exposed to moisture to hydrolyze the —X groups to —OH, the —OH in turn being condensed by the tin catalyst to cause polymerization of the silicon compound.

The method of the present invention is particularly well suited to emulsified silicone paper release coating applications. The dioctyl tin dineodeconate catalyst can be emulsified and introduced into the aqueous paper release coating bath, where it admixes with the silicone release composition and affects curing upon subsequent exposure to heat. The catalyst emulsion shows good shelf stability, requiring no additional solvents. When added to a silicone paper release coating composition it exhibits a long bath life and low odor; and paper coated with silicone compositions catalyzed with the dioctyl tin dineodeconate catalyst show superior cure rates and low release values (in grams/inch) when compared with available known catalyst emulsions and coating solutions.

Emulsification of the organo tin salt is assisted by an emulsifying surfactant (emulsifier) which will promote dispersion of the salt in an aqueous phase. Preferred for paper release coating purposes is polyvinyl alcohol.

In addition to the emulsifier, additional reagents and/or wetting agents may be employed as desired. Excellent emulsions, for example, of dioctyl tin dineodeconate have been achieved when small amounts of formalin (37% aqueous formaldehyde) and sodium lauryl sulfate are used.

The organosilicon compounds employed herein are those which contain on the average from 0.9 to 3 organic groups which are attached to the silicon through Si—C linkages. For the purpose of this invention it is immaterial what type of substituent is so attached to the silicon. Thus, the substituent group can be any hydrocarbon or any substituted hydrocarbon group. Preferably, the substituents are hydrocarbon groups such as aliphatic hydrocarbons, including methyl, ethyl, octadecyl, myricyl, vinyl, allyl, hexenyl and isopropyl; cycloaliphatic hydrocarbon groups such as cyclohexyl, cyclopentyl, methylcyclohexyl, cyclohexenyl and methylcyclohexenyl; aromatic hydrocarbon groups such as phenyl, tolyl, xenyl, xylyl and naphthyl; and aralkyl groups such as benzyl, β-phenylethyl, and β-phenylpropyl. Most preferably the substituents are alkyl, vinyl or phenyl.

The organosilicon compound can be contacted with the catalyst of this invention at any stage in its degree of polymerization. Thus one can contact silanols or diols with the tin compound or one can contact siloxanols having a high degree of polymerization in order to effect the final cure of the compositions.

The dioctyl tin dineodeconate employed herein is commercially available as Witco UL-38 Tin Catalyst (Witco Chemical Corporation). Unlike many of the conventional dilaurate catalysts, dioctyl tin dineodeconate is synthetically derived. This accounts for its high purity and may account in part for the unique combination of properties associated with its use in accordance with the method herein.

The proportion of catalyst is not critical for carrying out this invention. In general, as with any catalyst, one prefers to employ the smallest amount necessary to cause proper polymerization. The temperature of polymerization is not critical and varies widely depending upon the nature of the organosilicon compound. With some compounds polymerization will take place at room temperature or below, and with others, elevated temperatures are needed. Also the temperature employed varies with the time required for carrying out the polymerization. Thus, for example, elevated temperatures may be needed to cure a coating in a few seconds, whereas room temperature would suffice if the coating could be cured over a period of 24 hours.

In order that persons skilled in the art may better understand how to practice the present invention, the following examples are given by way of illustration and not by way of limitation.

The following is a description of the ingredients used in the formulations of the examples; the commercial names will be used hereinafter for brevity:

General Electric SM2145; a curable silicone emulsion containing 50% polydimethyl siloxane fluid and containing ≡SiOH and ≡SiH functional groups.

Kelgin; sodium alginate, used herein as a thickening agent.

General Electric SM2014C; a tin catalyst emulsion containing approx. 6% tin by weight in the form of dibutyl tin dilaurate.

General Electric SM2126C; a tin catalyst emulsion containing approx. 20% tin by weight in the form of di(n-octyl)tin-S,S'-bis(isooctyl mercapto acetate).

Dow-Corning 1171; a curable polydimethyl siloxane emuslion at 50% silicone solids by weight, containing ≡SiOH and ≡SiH groups.

Dow-Corning 1171A; an organo tin catalyst containing dioctyl tin dilaurate.

Catalyst 64 (Sun Chemical Corp.); an organo tin catalyst emulsion containing approx. 40% dioctyl tin dilaurate.

EY-164 (Dow-Corning); an organo tin catalyst emulsion containing a dialkyl tin bis(alkyl mercapto carboxylate).

Sunex 166 (Sun Chemical Corp.); an aqueous polymethyl-hydrogen siloxane emulsion at about 40% silicone solids by weight, containing ≡SiOH and ≡SiH groups.

EXAMPLE 1

A dioctyl tin dineodeconate emulsion catalyst was prepared for comparative testing, as follows:

0.2 weight percent formalin, 0.5 weight percent sodium lauryl sulfate, 12.5 polyvinyl alcohol and 20.3 weight percent deionized water were mixed and added to a vessel charged with 50.0 weight percent dioctyl tin dineodeconate. This mixture was blended until uniform in a high speed Polytron ® mixer, then an additional 10.5 weight percent deionized water was added and the mixture blended until homogenous. Finally, the resultant solution was passed through a colloidal mill (6 mil gap at atmospheric pressure). A stable emulsion was produced having 51% solids, viscosity of 820 cps. and pH of 6.5 Centrifuge stability testing yielded no separation, top or bottom; and no additional solvent was required to maintain stability.

EXAMPLE 2

The catalyst emulsion of Example 1 was added to General Electric SM2145 primary coating emulsion for comparison of cure performance with other commercially available coating emulsion-catalyst emulsion combinations. The test compositions and cure results are shown below.

| Weight % | |
|---|---|
| | SAMPLE A |
| 12.0 | General Electric SM2145 coating emulsion |
| 1.2 | dioctyl tin dineodeconate catalyst emulsion (this invention) |
| 50.0 | 1% Kelgin solution |
| 36.8 | water |
| | SAMPLE B |
| 12.0 | General Electric SM2145 coating emulsion |
| 0.8 | General Electric SM2014c catalyst emulsion |
| 50.0 | 1% Kelgin solution |
| 37.2 | water |
| | SAMPLE C |
| 12.0 | General Electric SM2145 coating emulsion |
| 3.0 | General Electric SM2126c catalyst emulsion |
| 50.0 | 1% Kelgin solution |
| 35.0 | water |
| | SAMPLE D |
| 12.0 | Dow Corning 1171 coating emulsion |
| 1.2 | Dow Corning 1171A catalyst |
| 50.0 | 1% Kelgin solution |
| 36.8 | water |
| | SAMPLE E |
| 12.0 | Dow Corning 1171 coating emulsion |
| 3.0 | Dow Corning EY-164 catalyst |
| 50.0 | 1% Kelgin solution |
| 35.0 | water |
| | SAMPLE F |
| 12.0 | Sunex 166 coating |
| 1.2 | Catalyst 64 |
| 50.0 | 1% Kelgin solution |
| 36.8 | water |

| | Cure Time (sec) | | | | | |
|---|---|---|---|---|---|---|
| Cure Temp. (°F.) | A | B | C | D | E | F |
| 400 | 10 | 20 | 15 | 10 | 18 | 10 |
| 325 | 15 | 25 | 25 | 15 | 25 | 15 |

| | | | | | | |
|---|---|---|---|---|---|---|
| 250 | 25 | 35 | >60 | 40 | >60 | 35 |

It is evident that the coating bath employing the catalyst of this invention (Sample A) generally has a faster cure rate than the other formulations, especially at lower temperatures. Cure rate at 250° F. is particularly significant, since lower temperature curing leads to cost savings and allows a wider variety of substrates to be heat cured after coating. Furthermore, sulfur-containing catalysts, such as General Electric's SM2126c (Sample C, above), require reaching a threshold temperature before curing is initiated. This is not a concern with dioctyl tin dineodeconate.

EXAMPLE 3

The bath life of a solution containing the catalyst emulsion of the present invention and General Electric SM2014c, the primary catalyst for General Electric's SM2145 coating emulsion, were compared.

| | Sample | |
|---|---|---|
| Ingredients (wt %) | G | H |
| General Electric SM2145 coating emulsion | 14.0 | 14.0 |
| General Electric SM2014c catalyst | 1.4 | — |
| dioctyl tin dineodeconate emulsion | — | 1.4 |
| 1% Kelgin solution | 50.0 | 50.0 |
| water | 34.6 | 34.6 |

The bath life of both samples, guaged as the length of time that a coating bath yields coatings with low release values (i.e., less than 50 gr/inch), was measured and appears below.

| | Release (gr/inch) | |
|---|---|---|
| Bath Age (hours) | G | H |
| 0 | 5–8 | 9–11 |
| 1 | 8–15 | 8–13 |
| 2 | 50–90 | 7–11 |
| 3 | 125–200 | 5–8 |
| 4 | — | 4–8 |
| 5 | — | 6–10 |
| 6 | — | 4–8 |
| 24 | — | 5–10 |

It can be seen that the bath life of a coating bath employing the instant invention is much longer than the SM2145/SM2014c combination. This longer bath life is comparable to other common commercial combinations: General Electric SM2145/SM2126c, Dow Corning DC1171/1171A, Dow Corning DC1171/EY-164 and Sunex 166/Catalyst 64.

EXAMPLE 4

The odor of the present dioctyl tin dineodeconate catalyst is believed to be less than conventional catalysts. Although the perception of objectionable odors is somewhat subjective, some general agreement exists in the art. Sulfur-containing catalysts, for instance, emit an objectionable odor upon curing as they undergo thermal decomposition. This has limited these catalysts' acceptance in the industry.

Other common catalysts, such as dibutyl tin dilaurate and dioctyl tin dilaurate, do not contain sulfur, but they may give off more odor than dioctyl tin dineodeconate because of the respective purities of dilaurates and neodeconates. The dilaurates are produced from reactions with lauric acid. Being a natural (as opposed to synthesized) product, lauric acid contains traces of higher carboxylic acid such as myristic, palmitic and stearic acids. Neodeconates, on the other hand, are extremely high in purity because they are synthetically derived.

Obviously, modifications of the present invention are possible in light of the above teachings. It is understood, however, that any changes made in the particular embodiments of the invention described are within the full intended scope of the invention as defined by the appended claims.

We claim:

1. A dioctyl tin dineodeconate catalyst emulsion capable of promoting cross-polymerization of silanol-containing organosilicon compounds comprising, in intimate admixture:
    (a) a major proportion of dioctyl tin dineodeconate, and
    (b) minor proportions, independently, of (i) water and (ii) polyvinyl alcohol.

2. The catalyst emulsion as defined in claim 1 which also includes the minor components, (iii) formalin and (iv) sodium lauryl sulfate.

3. The catalyst emulsion as defined in claim 2 wherein said emulsion contains about 50 weight percent dioctyl tin dineodeconate, about 30.8 weight percent water, about 12.5 weight percent polyvinyl alcohol, about 0.5 weight percent sodium lauryl sulfate, and about 0.2 weight percent formalin.

4. A dioctyl tin dineodeconate catalyst emulsion capable of promoting cross-polymerization of silanol-containing organosilicon compounds prepared by
    (1) admixture (a) a major proportion of dioctyl tin dineodeconate with (b) minor proportions, independently, of water polyvinyl alcohol, formalin and sodium lauryl sulfate;
    (2) blending the admixture, with required small amounts of water, until homogenous; and thereafter
    (3) milling the homogeneous blend to produce a stable emulsion.

* * * * *